(12) United States Patent
Ehara

(10) Patent No.: US 8,727,540 B2
(45) Date of Patent: May 20, 2014

(54) IMAGE PROJECTING DEVICE HAVING A TOPPLING DETECTING PART

(75) Inventor: Mikinori Ehara, Kanagawa (JP)

(73) Assignee: Ricoh Company, Ltd., Tokyo (JP)

(*) Notice: Subject to any disclaimer, the term of this patent is extended or adjusted under 35 U.S.C. 154(b) by 2 days.

(21) Appl. No.: 13/551,763

(22) Filed: Jul. 18, 2012

(65) Prior Publication Data

US 2013/0027672 A1   Jan. 31, 2013

(30) Foreign Application Priority Data

Jul. 27, 2011  (JP) ................. 2011-164545

(51) Int. Cl.
G03B 21/14   (2006.01)

(52) U.S. Cl.
USPC ............... 353/69; 353/70; 353/98; 348/744; 348/745; 345/5; 345/11

(58) Field of Classification Search
USPC ............ 353/69, 70, 98; 348/744–748, 148, 348/E5.09, E7.087; 349/5, 7–9, 11
See application file for complete search history.

(56) References Cited

U.S. PATENT DOCUMENTS

| | | | |
|---|---|---|---|
| 6,637,896 B2 * | 10/2003 | Li et al. | 353/119 |
| 7,048,388 B2 | 5/2006 | Takaura et al. | |
| 7,824,039 B2 * | 11/2010 | Takito et al. | 353/69 |
| 8,182,093 B2 * | 5/2012 | Kurozuka et al. | 353/37 |
| 2008/0111976 A1 | 5/2008 | Takito et al. | |
| 2008/0180643 A1 | 7/2008 | Endo et al. | |
| 2009/0040473 A1 * | 2/2009 | Amano et al. | 353/70 |

FOREIGN PATENT DOCUMENTS

| | | |
|---|---|---|
| JP | 2002-268142 | 9/2002 |
| JP | 2003-280091 | 10/2003 |
| JP | 2007-316674 | 12/2007 |
| JP | 2008-009136 | 1/2008 |

OTHER PUBLICATIONS

Extended European search report dated Dec. 21, 2012.

* cited by examiner

Primary Examiner — Sultan Chowdhury
(74) Attorney, Agent, or Firm — IPUSA, PLLC

(57) ABSTRACT

An image projecting device for projecting an image on a screen is provided. The image projecting device includes a toppling detecting part that detects a toppling of the image projecting device; a toppling direction detecting part that detects a direction in which the image projecting device topples; and a controlling part that controls the image projecting device such that the image projecting device continues to project the image if the toppling detecting part detects the toppling of the image projecting device and the toppling direction detected by the toppling direction detecting part is directed toward the screen, while the image projecting device stops projecting the image if the toppling direction detected by the toppling direction detecting part is directed away from the screen.

4 Claims, 12 Drawing Sheets

FIG.7
(a)
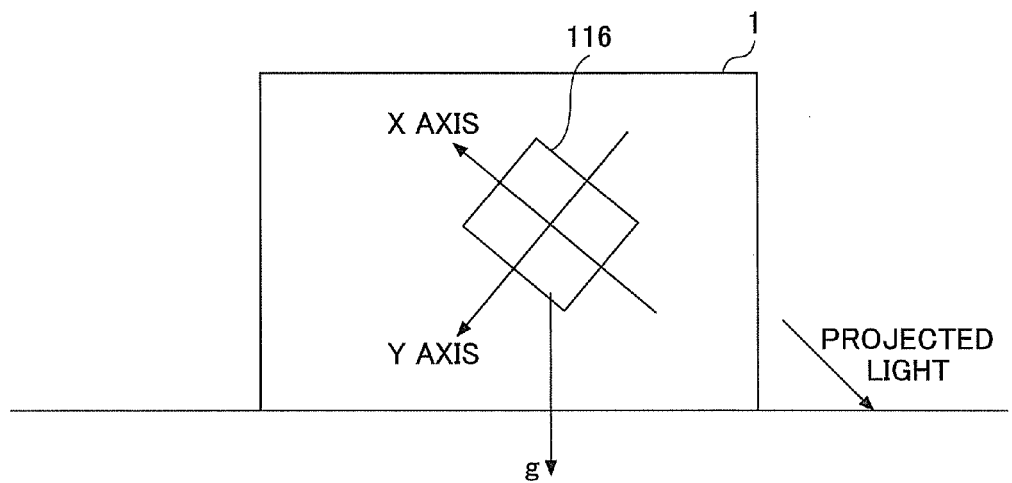
(b)
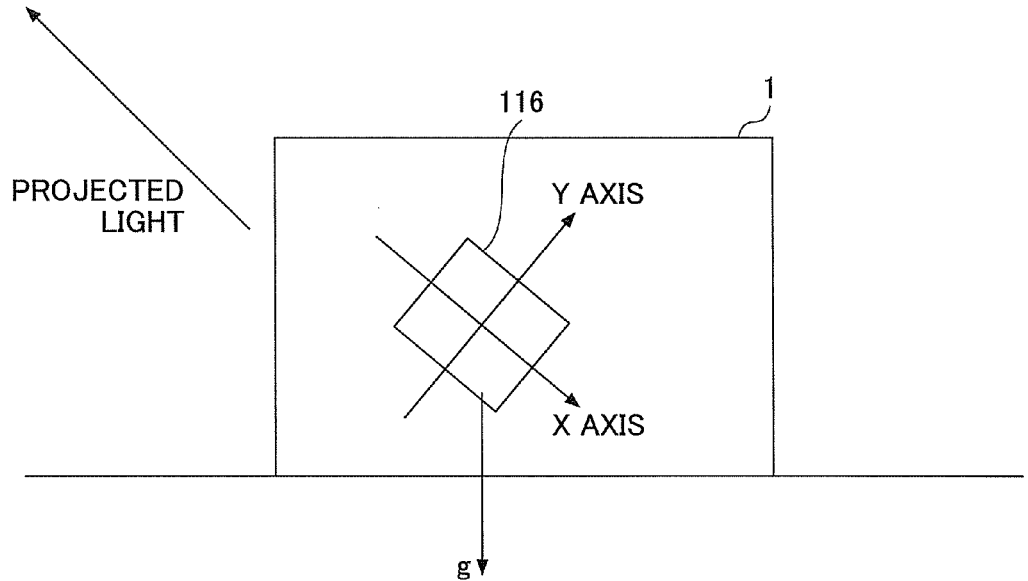

IMAGE PROJECTING DEVICE HAVING A TOPPLING DETECTING PART

FIELD

The present invention is related to a control technique of an image projecting device.

BACKGROUND

Recently, an image projecting device called an "ultra-short focus projector" has been commercialized. The ultra-short focus projector has the same projector screen size as conventional projectors but requires a shorter length to a projector surface (i.e., a screen). Since the distance to the projector surface is shorter, there are the following merits.
1. A space can be effectively utilized.
2. Projected light does not easily impinge on a presenter, and thus glare is reduced and a ghost image is prevented.
3. A distance between the image projecting device and a viewer is made greater, and thus heat and noise from the image projecting device is not annoying.

In order to make these merits more effective, it is preferred that the image projecting device has a vertical configuration so that a footprint is reduced and the image projecting device can be placed closer to a wall.

However, if the image projecting device has a vertical configuration, it can topple easily. If the image projecting device topples, the projected light may be shown into the eyes of the viewer and cause glare. Further, if the toppled image projecting device is left for a long time, a cooling mechanism does not work sufficiently, which increases the temperature of the image projecting device and causes internal parts to fail. For this reason, there is a technique for automatically stopping the projection if toppling of the image projecting device is detected.

Japanese Laid-open Patent Publication No. 2008-009136 discloses an image projection device for projecting an image which device projects a plurality of images in a plurality of directions around an image projection device main body nearly on the same surface as the installation surface of the image projection device, for the purpose of providing an image projection device readily installed on a table in a conference or the like and projecting an image in front of all the persons present, thereby progressing an argument. This image projecting device includes an inertia sensor as a detecting part for detecting the toppling, and turns off the power supply of a light source to stop the output when the toppling of the image projecting device is detected.

As described above, according to the image projecting device of the prior art which forcefully stops the projection when the toppling of the image projecting device is detected, there is a problem that it takes time to resume the projection after the image projecting device is restored to the original position. This is because it takes a certain time for an ordinary image projecting device to restart the projection once the projection is stopped.

The present invention is made in consideration of the problem of the prior art described above, and an object of the present invention is to provide an image projecting device with increased convenience by minimizing stoppage of the image projection at the time of toppling of the image projecting device.

SUMMARY

In order to solve the problem, according to the present invention, an image projecting device for projecting an image on a screen is provided. The image projecting device includes a toppling detecting part that detects a toppling of the image projecting device; a toppling direction detecting part that detects a direction in which the image projecting device topples; and a controlling part that controls the image projecting device such that the image projecting device continues to project the image if the toppling detecting part detects the toppling of the image projecting device, and the toppling direction detected by the toppling direction detecting part is directed toward the screen, while the image projecting device stops projecting the image if the toppling direction detected by the toppling direction detecting part is directed away from the screen.

According to the image projecting device, by minimizing stoppage of the image projection at the time of toppling of the image projecting device, a waiting time required to resume the projection is reduced and thus convenience is increased.

BRIEF DESCRIPTION OF DRAWINGS

FIG. 7 is a diagram for illustrating an example of a determination of toppling with an acceleration sensor (no. 2).

DESCRIPTION OF EMBODIMENTS

In the following, embodiments of the present invention will be described with reference to the accompanying drawings. It is noted that an ultra-short focus projector with a vertical configuration is explained as an example of an image projecting device; however, any projector may be used instead.

[Fundamental Concept]

An image projecting device according to the prior art forcefully stops the projection when the toppling of the image projecting device is detected. In contrast, according to the present invention, a determination whether the projected light of the image projecting device is directed to a viewer as a result of toppling of the image projecting device is used to determine whether to stop the projection.

In other words, if the image projecting device topples and the projected light of the image projecting device is not directed to a viewer, the projected light is not shown into the eyes of the viewer and thus the viewer does not perceive glare. Therefore, in this case, it is not necessary to immediately stop the image projection. Within a short time, a temperature increase due to a problem of a cooling mechanism is not substantial, and there is low probability that the device becomes disabled. By continuing the image projection without stopping it, a normal image projection can be resumed merely by restoring the toppled image projecting device to its original position. Thus, a waiting time required to resume the projection is eliminated, thereby increasing convenience.

In contrast, if the projected light of the image projecting device is directed to a viewer, the projected light is shown into the eyes of the viewer and thus the viewer perceives glare. Therefore, in this case, the image projection is immediately stopped.

Further, even if the image projecting device topples and the projected light of the image projecting device is not directed to a viewer, continuing the image projection for a long time causes a high temperature increase due to a problem of a cooling mechanism and a high probability that the device becomes disabled. Therefore, if an elapsed time after the toppling reaches a predetermined time or a temperature inside the device reaches a predetermined temperature, the image projection is stopped.

[First Embodiment]

Figure 1:
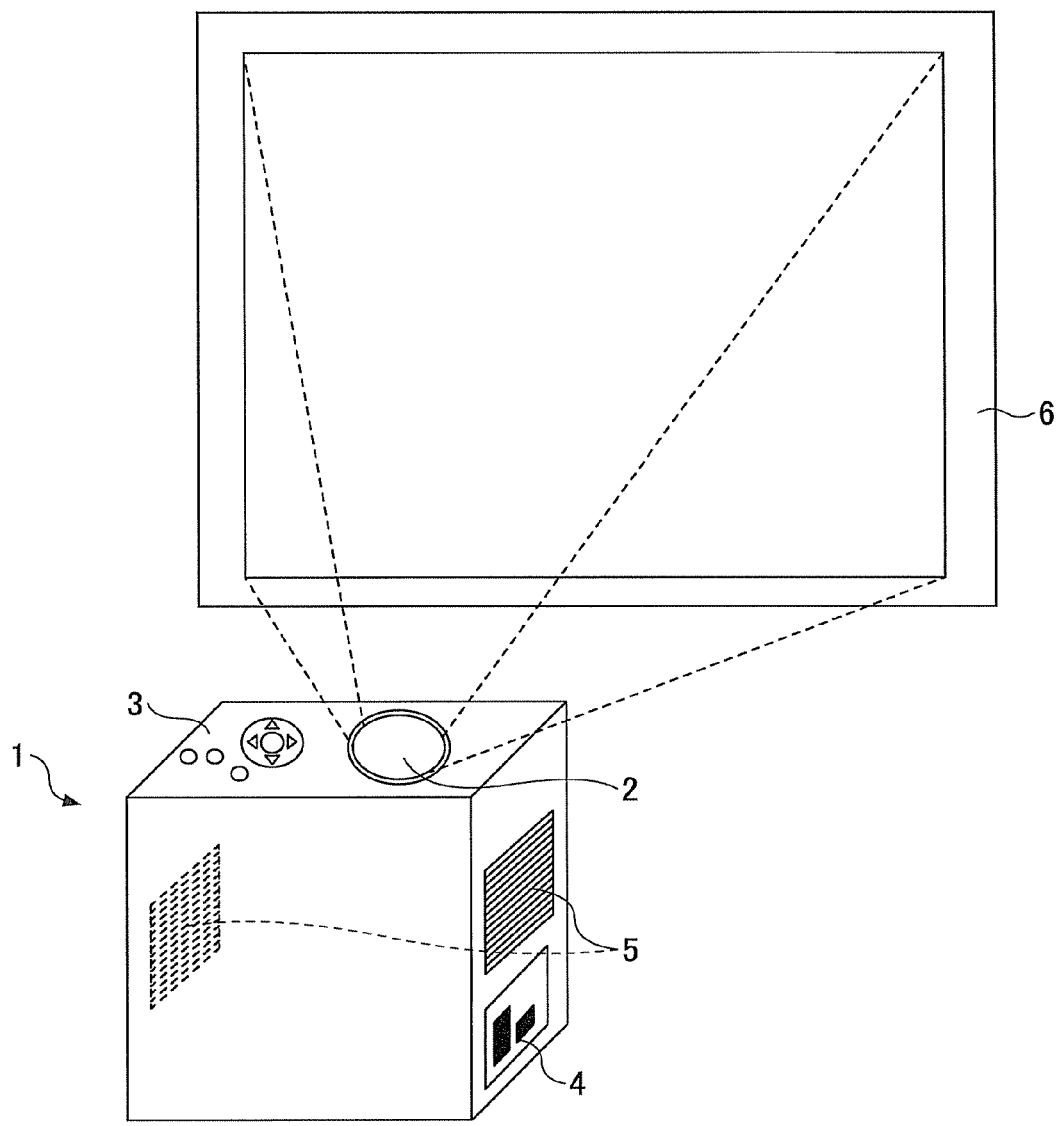
FIG. 1 is an example of an external view of an image projecting device according to a first embodiment.

FIG. 1 is an example of an external view of an image projecting device 1 according to a first embodiment.

The image projecting device 1 according to the embodiment emits light via a projection aperture 2 at the top of the device to project an image on a screen 6. The image projecting device 1 has the same projector screen size as ordinary projectors but it is characterized in that it requires a shorter length to a projector surface. A technique for implementing such a ultra-short focus is a projection optical system disclosed in Japanese Laid-open Patent Publication No. 2007-316674, for example.

Further, the image projecting device 1 is also characterized in that it has a vertical configuration. The vertical configuration has a advantage in that it can reduce the foot print of the image projecting device 1.

An operation part 3 provided on an upper surface of the device includes plural buttons which are used for an on/off operation of a power supply, operations for various settings, switching of input signals, etc.

Connection terminals 4 and ventilating openings 5 are provided on a side of the device. To the connection terminals 4 can be connected cables from various video apparatuses such as a computer, a DVD player, and can be input image signals. Further, air is exchanged between the outside via ventilating openings 5 with an internal fan. In this way, a lamp, an optical system, etc., in a casing are cooled.

Figure 2:
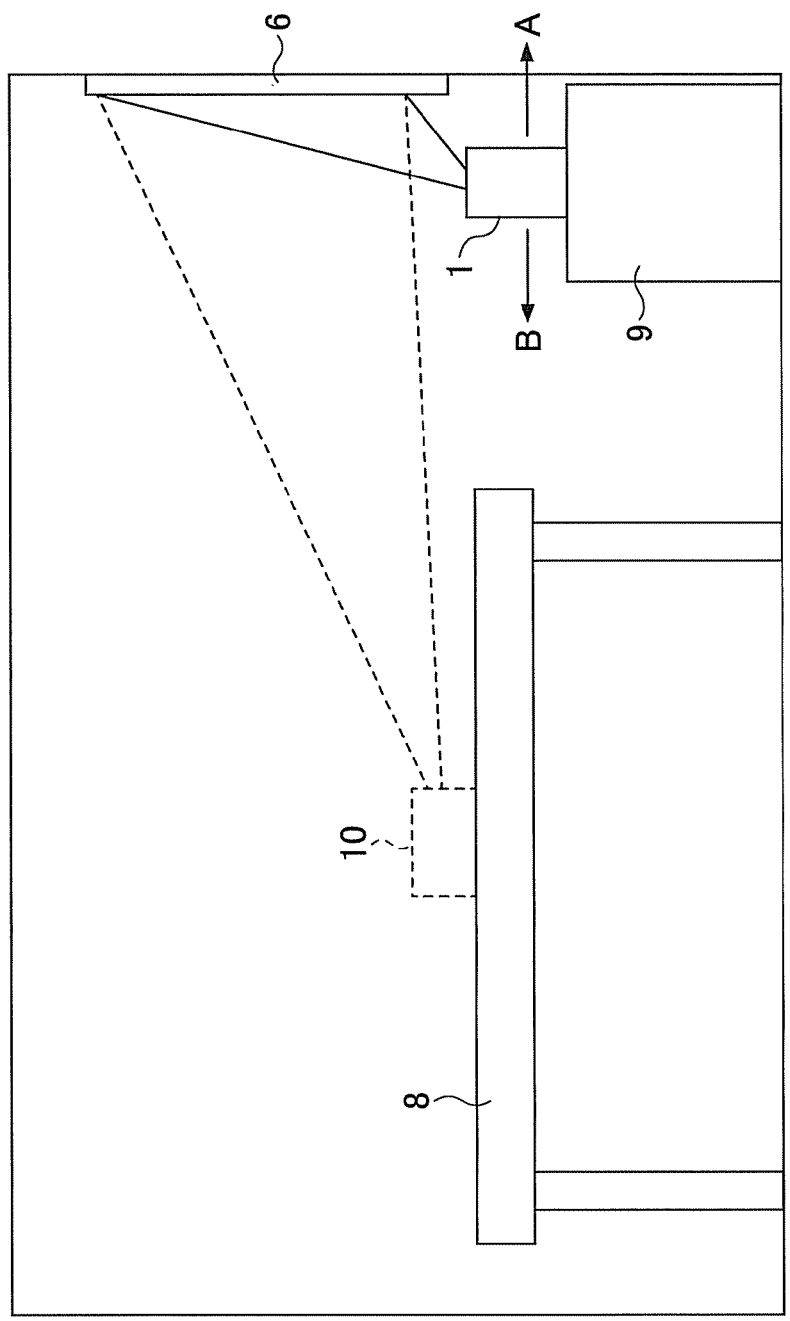
FIG. 2 is a diagram for illustrating an example of an arrangement of the image projecting device.

FIG. 2 is a diagram for illustrating an example of an arrangement of the image projecting device and is a side view of a conference room or the like.

An image projecting device 10 is a projector with an ordinary focal distance which is illustrated for the sake of the comparison. In the case of the ordinary focal distance, it is necessary to provide the image projecting device 10 at a place (near a center of a table 8 in the illustrated example) which is a relatively long distance away from the screen 6. To the contrary, the image projecting device 10 according to the embodiment can be provided at a place (on a stage 9 in the illustrated example) near the screen 6 because of a shorter focal distance.

In the case of the ordinary image projecting device 10, it is necessary to reserve installation space on the table 8. Further, since a presenter performs an explanation standing in front of the screen 6, there are problems that the presenter perceives glare by the projected light from the image projecting device 10 and the projected light is blocked by a part of the body of the presenter and thus a part of the projected image is not visible. Further, since an attendant of the conference or the like sits around the table 8, the heat and the noise from the image projecting device 10 may annoy the attendant.

In the case of the image projecting device 1, the image projecting device 1 is provided near the screen 6, so that it is not necessary to reserve the installation space on the table 8. Further, since the presenter can perform the explanation standing in front of the image projecting device 1, the presenter does not perceive glare by the projected light and does not block the projected light. Since the image projecting device 1 is away from the attendant, the heat and the noise don't annoy the attendant. Further, since the image projecting device 1 has a vertical configuration, the installation space can be reduced. The image projecting device 1 can have a vertical configuration with a further increased height, thereby further reducing the installation space.

However, such a vertical configuration increases a probability of toppling in comparison with a horizontal configuration. If a toppling direction is divided broadly, the toppling direction can be a direction A to a side of the screen 6 or an opposite direction B to a side of the table 8.

If the image projecting device topples in the direction B, there is a probability that the projected light impinges on the attendant. For this reason, it is desired that the projection is stopped immediately. On the other hand, if the image projecting device topples in the direction A, since the projected light impinges on the wall, it is not necessary to stop the projection.

In general, it takes time for the projector to resume the projection after the projection has been stopped. For this reason, in terms of increasing convenience for users, it is better to continue the projection except for necessary cases.

However, if the projection is continued while the image projecting device 1 remains toppled, the temperature inside the device becomes high, which causes parts to become disabled. A cooling mechanism of the image projecting device is designed based on a promise that the image projecting device is in its normal operating status, and thus the cooling mechanism does not work normally in statuses other than the normal operating status. For this reason, even if the projection is continued in the toppled status, it may be better to stop the projection if the toppled status continues for more than a predetermined time.

Figure 3:
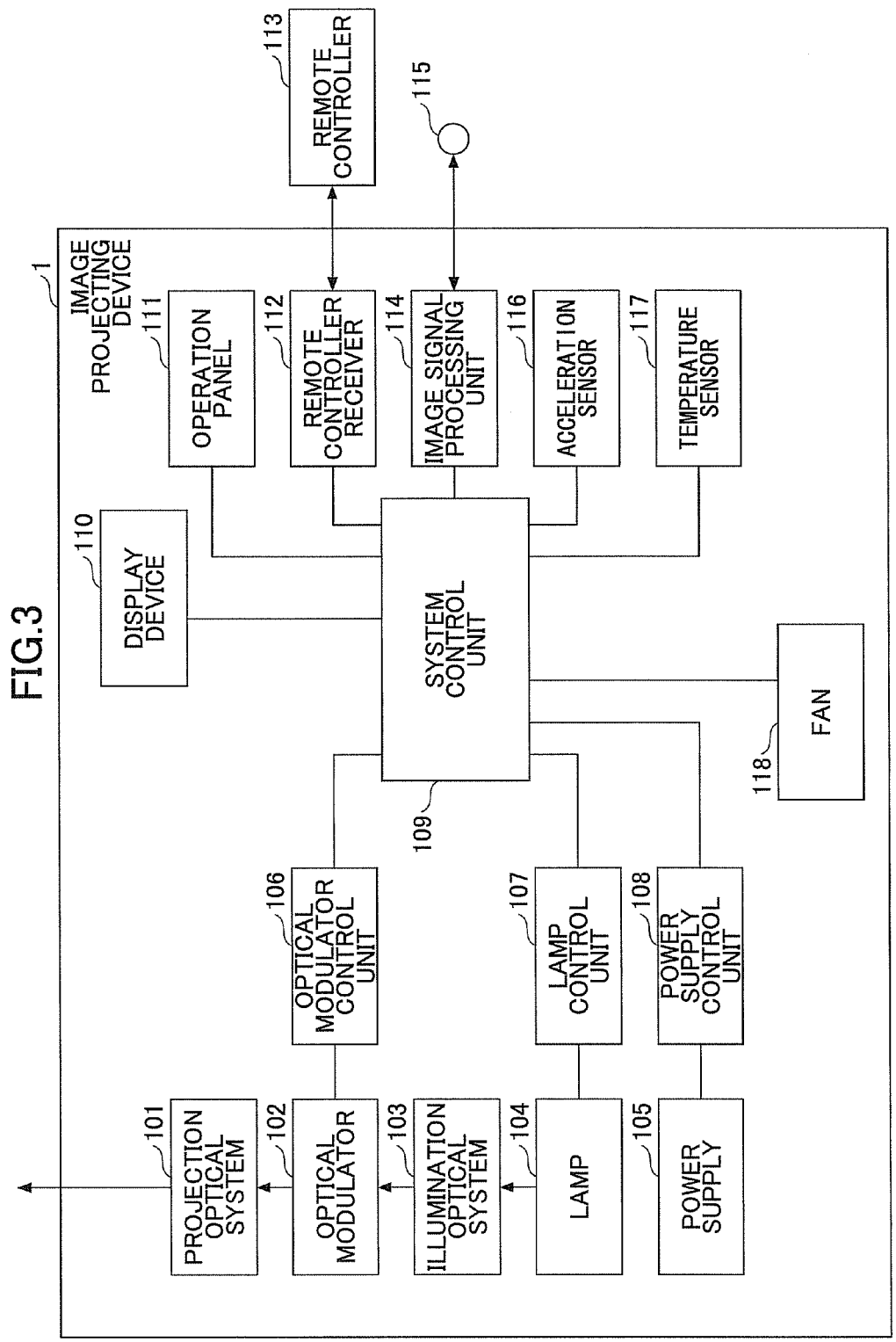
FIG. 3 is a diagram for illustrating an example of a hardware configuration of the image projecting device according to the first embodiment.

FIG. 3 is a diagram for illustrating an example of a hardware configuration of the image projecting device 1 according to the first embodiment.

The image projecting device 1 includes a lamp 104, an illumination optical system 103, an optical modulator 102 and a projection optical system 101. Light emitted from the lamp 104 is radiated to the optical modulator 102 via a lens and a mirror of the illumination optical system 103. The optical modulator 102 is configured by a liquid crystal panel and digital micro mirror device (DMD), and is capable of forming an image based on an image signal input from the outside. The light modulated by the optical modulator 102 is projected on the screen 6 (see FIG. 1 and FIG. 2) via a lens and a mirror of the projection optical system 101.

Further, the image projecting device 1 includes a power supply 105 which supplies electric power to the lamp 104, the optical modulator 102, the fan 118, etc.

Control units (106, 107 and 108) are provided for controlling the respective operations of the optical modulator 102, the lamp 104 and the power supply 105, and are controlled collectively by a system control unit 109.

The system control unit 109 is configured by a CPU (Central Processing Unit), a memory, etc., and controls an operation of the image projecting device 1 as a whole based on various input information.

The image signal from the outside is input to the image projecting device 1 via an external interface 115. The image signal is processed by an image signal processing unit 114 and the system control unit 109 and an instruction is sent to the optical modulator control unit 106 to affect the operation of the optical modulator 102.

When a user operates the image projecting device 1, the user uses an operation panel 111 or a remote controller 113. Information on the operation at the operation panel 111 is transmitted directly to the system control unit 109. Further, information on the operation at the remote controller 113 is transmitted to the system control unit 109 via a remote controller receiver 112. The system control unit 109 which receives the information performs the process corresponding to the received information.

Further, the user can know a status of the image projecting device via a display device 110. The display device 110 is configured by LEDs (Light Emitting Diodes), for example. The display device 110 receives information from the system control unit 109 according to the on/off operation of the power supply of the image projecting device 1, error generation, etc., and turns on or off the LEDs to inform the user of the status of the image projecting device 1.

Further, the image projecting device 1 includes various sensors such as an acceleration sensor 116 and a temperature sensor 117.

The acceleration sensor 116 is capable of measuring an inclination of the image projecting device 1. Information on the measured inclination is transmitted to the system control unit 109 where it can be used to correct a trapezoidal distortion of a projecting image. Further, if the inclination angle is great, it can be considered that the image projecting device 1 is toppled. This idea can be utilized for detection of the toppling. Further, it is also possible to use an acceleration sensor capable of measuring accelerations in plural axes to detect a direction in which the image projecting device 1 is toppled.

The temperature sensor 117 is capable of measuring a temperature in the image projecting device 1. Information on the measured temperature is transmitted to the system control unit 109 which performs a control so as to keep an appropriate temperature in the image projecting device 1, such as changing the rpm of the fan 118, or stopping the projection when the temperature is too high.

The fan 118 is used to exchange air between the outside and the inside of the image projecting device 1. Further, the fan 118 controls the flow of the air in the casing such that the air impinges on the part whose temperature is high so as to cool the part to an appropriate temperature.

Figure 4:
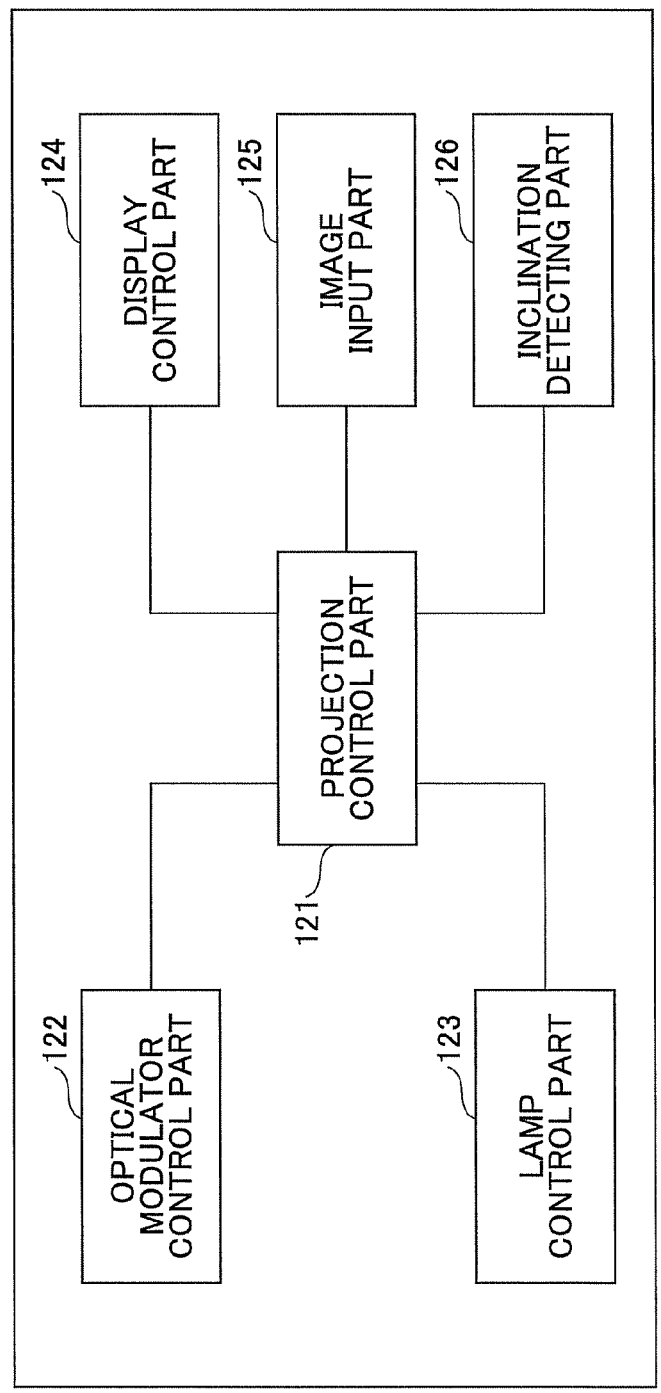
FIG. 4 is a diagram for illustrating an example of a function of a control system of the image projecting device according to the first embodiment.

FIG. 4 is a diagram for illustrating an example of a function of a control system of the image projecting device 1 according to the first embodiment.

The control system includes a projection control part 121, an optical modulator control part 122, a lamp control part 123, a display control part 124, an image input part 125, and an inclination detecting part 126.

The projection control part 121 controls the projection of the image based on the image information from the image input part 125. Further, the projection control part 121 corrects the trapezoidal distortion of the projecting image based on the inclination information from the inclination detecting part 126.

The optical modulator control part 122 controls the operation of the optical modulator 102 (see FIG. 3) based on the image data transmitted from the projection control part 121.

The lamp control part 123 controls a light amount and an on/off status of the lamp 104 (see FIG. 3) based on the information from the projection control part 121.

The display control part 124 controls the on/off status, etc., of the LED of the display device (see FIG. 3) based on the information from the projection control part 121.

The image input part 125 processes the image signal from the external video apparatus.

The inclination detecting part 126 periodically detects the inclination angle and the inclination direction of the image projecting device based on the measurement of the acceleration sensor 116 (see FIG. 3), and transmits the detected information to the projection control part 121.

Figure 5:
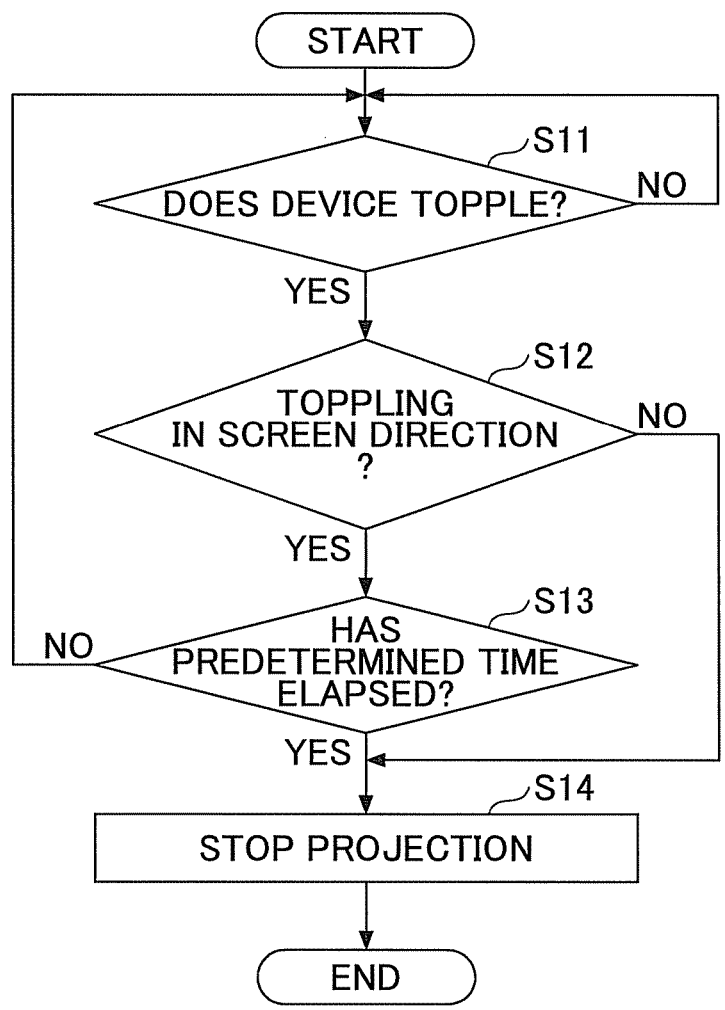
FIG. 5 is a flowchart for illustrating an example of a process of the image projecting device according to the first embodiment.

FIG. 5 is a flowchart for illustrating an example of a process of the image projecting device 1 according to the first embodiment.

When the process is started at power-on of the image projecting device 1 or process restarting, the projection control part 121 checks whether the image projecting device 1 topples based on the inclination angle information from the inclination detecting part 126 (step 11). For example, if the inclination angle becomes greater than a predetermined angle, it is determined that the image projecting device 1 topples.

Figure 6:
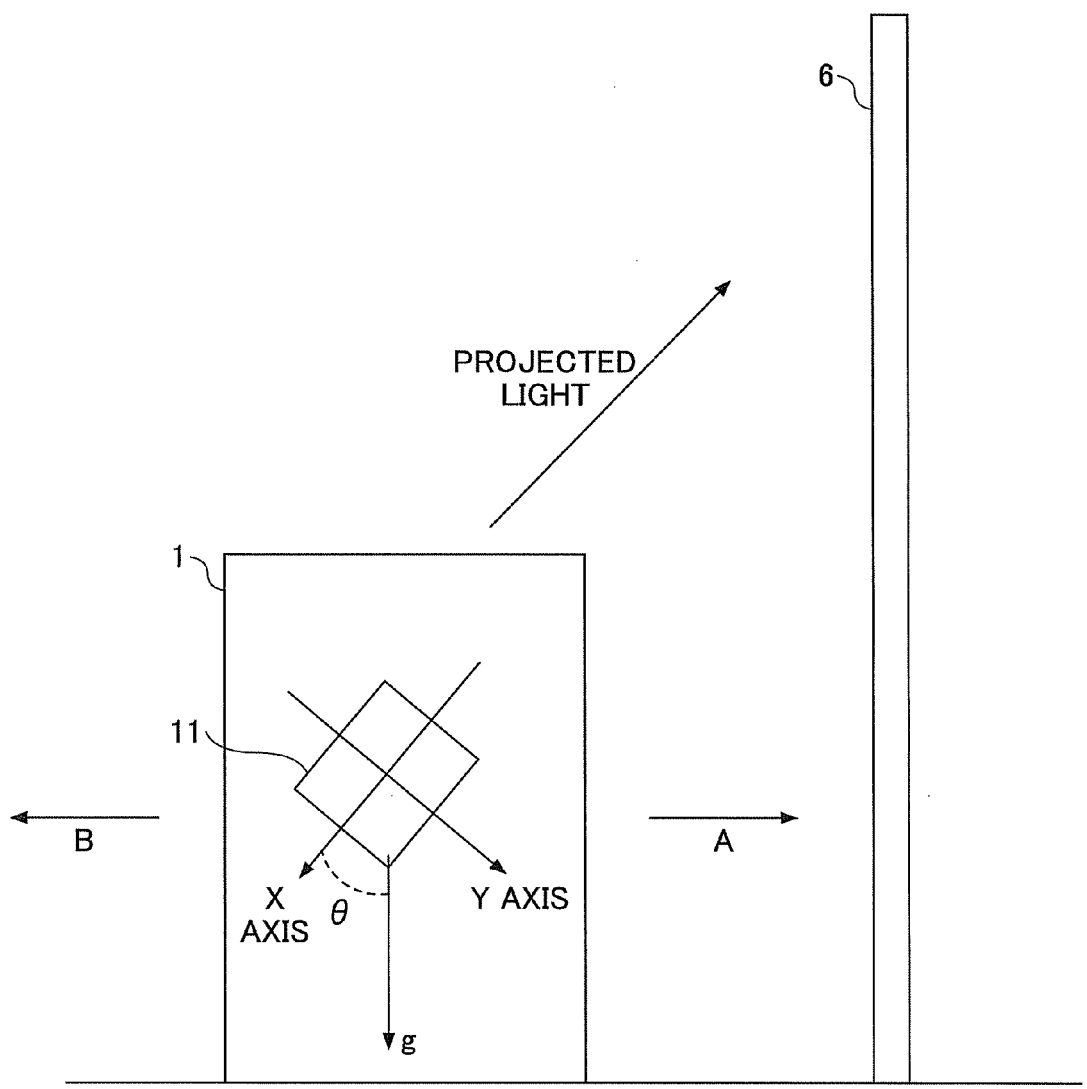
FIG. 6 is a diagram for illustrating an example of a determination of toppling with an acceleration sensor (no. 1).

FIG. 6 is a diagram for illustrating an example of a determination of toppling with the acceleration sensor 116. As illustrated in FIG. 6, for example, it is assumed that the acceleration sensor 116 is arranged with an inclination angle of degrees with respect to the image projecting device 1. The acceleration sensor 116 is capable of measuring an acceleration gX in an X-axis direction and an acceleration gY in a Y-axis direction. Then, the inclination angle θ (an angle of gravity from a positive X-axis to a positive Y-axis) can be calculated using the acceleration values gX and gY, as follows.

$$\theta = \tan^{-1}(gY/gX)$$

If it is assumed that the measurements of the acceleration sensor 116 when the image projecting device 1 is disposed horizontally (θ=45 degree) as illustrated in FIG. 6 have a relationship (gX, gY)=(0.707, 0.707). In this case, if the image projecting device 1 topples in the direction A (i.e., the screen direction) to be in a status (θ=135 degrees) illustrated in FIG. 7(a), (gX, gY)=(−0.707, 0.707), and if the image projecting device 1 topples in the direction B (i.e., the direction opposite to the screen direction) to be in a status (θ=315 degree) illustrated in FIG. 7(b), (gX, gY) =(0.707, −0.707).

In this way, by measuring the values of gX and gY, the inclination angle and the inclination direction of the image projecting device 1 can be detected.

Referring to FIG. 5 again, if it is determined that the image projecting device does not topple (No in step 11), nothing special is done, and after a predetermined time has elapsed, it is checked again whether the image projecting device topples (step 11).

If it is determined that the image projecting device topples (Yes in step 11), it is determined in which direction, the screen direction (direction A) or the direction opposite to the screen direction (direction B), the image projecting device topples (step 12).

If it is determined that the image projecting device 1 topples in the screen direction (Yes in step 12), it is determined whether a predetermined time has elapsed since it is determined that the image projecting device 1 topples (step 13). If the image projecting device 1 topples in the screen direction, the projected light is not shown into the eyes of the viewer and thus it is not necessary to immediately stop the projection. However, since it is not safe to continue the projection in terms of the cooling mechanism of the image projecting device 1, it is determined whether the predetermined time has elapsed.

If it is determined that the predetermined time has not elapsed yet (No in step 13), the process routine returns to the checking process for checking whether the image projecting device topples (step 11). The reason why the process routine returns to the checking process is because it is predicted that the user restores the toppled image projecting device to its original status.

If it is determined that the image projecting device topples in the direction opposite to the screen direction (No in step 12) or that the predetermined time has elapsed even though the image projecting device toppled in the screen direction (Yes in step 13), the projection is stopped (step 14). Specifically, the projection control part 121 transmits an instruction to stop the projection to the optical modulator control part 122, the lamp control part 123 and the display control part 124. The optical modulator control part 122, in response to the instruction, controls the optical modulator 102 such that the projecting image is turned off. Further, the lamp control part 123 turns the lamp 104 off. The display control part 124 turns on or off the LEDs of the display device 110 to inform the user that the projection is stopped due to the toppling.

It is noted that, according to the example described above, if the image projecting device 1 topples in the screen direction, the elapsed time after the toppling is used to determine whether to continue or stop the projection; however, it may be checked whether a temperature in the image projecting device 1 is greater than a predetermined value using the temperature sensor 117 to determine whether to continue or stop the projection (continue the projection if the temperature is not greater than the predetermined value, and stop the projection if the temperature is greater than the predetermined value).

[Second Embodiment]

Figure 8:
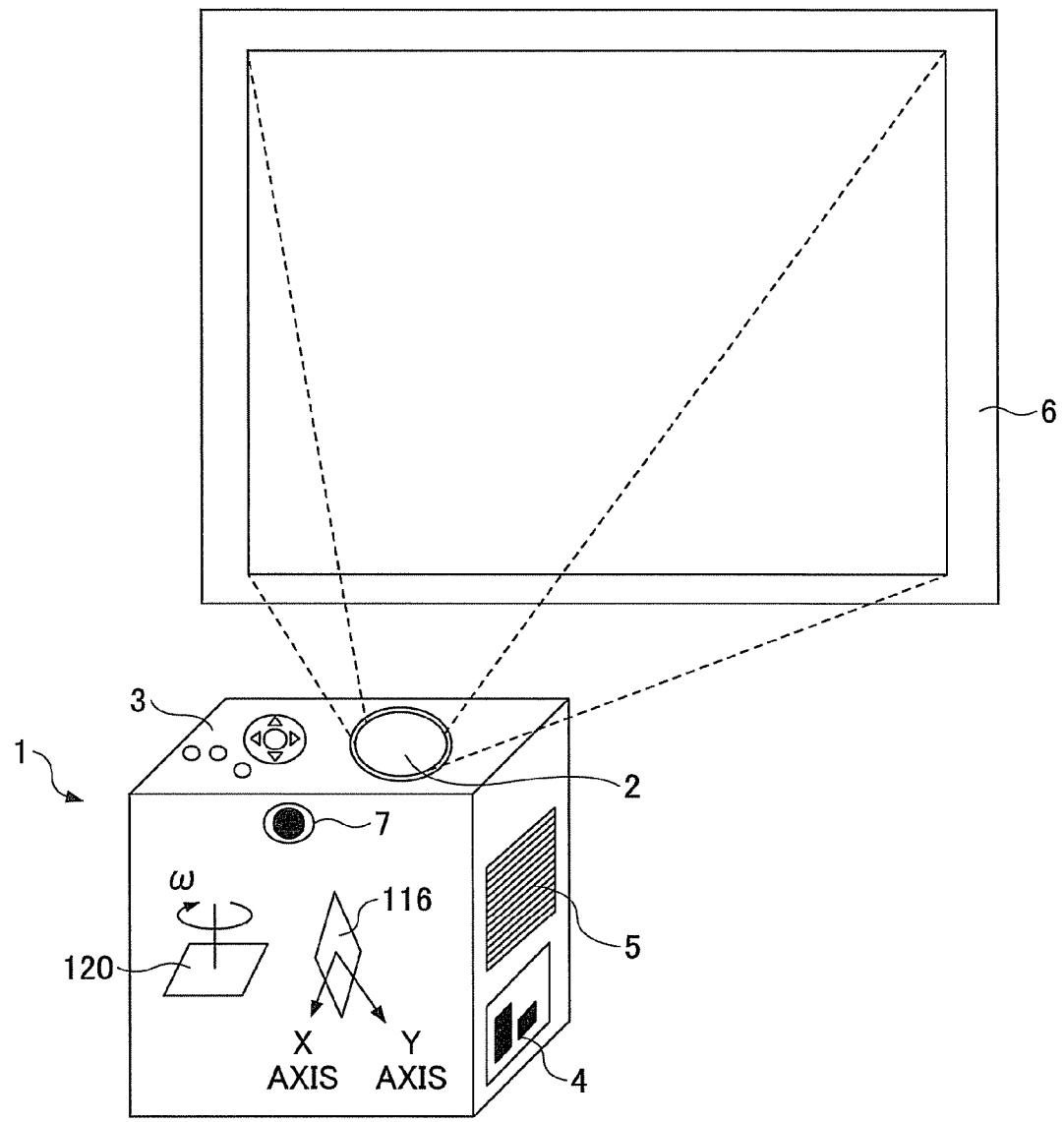
FIG. 8 is an example of an external view of an image projecting device according to a second embodiment.

FIG. 8 is an example of an external view of an image projecting device 1 according to a second embodiment.

The image projecting device 1 according to the embodiment includes a camera 7. The camera 7 is disposed on a side away from the screen 6 and captures a scene in the direction opposite to the screen 6. Further, the image projecting device 1 includes a gyroscope sensor 120 in addition to the acceleration sensor 116. The gyroscope sensor 120 is capable of measuring an angular velocity w around a vertical axis. With this arrangement, it is possible to detect a rotating amount of the image projecting device 1 around the vertical direction in addition to the inclination of the image projecting device 1 in the screen direction. Other configurations are the same as illustrated in FIG. 1.

Figure 9:
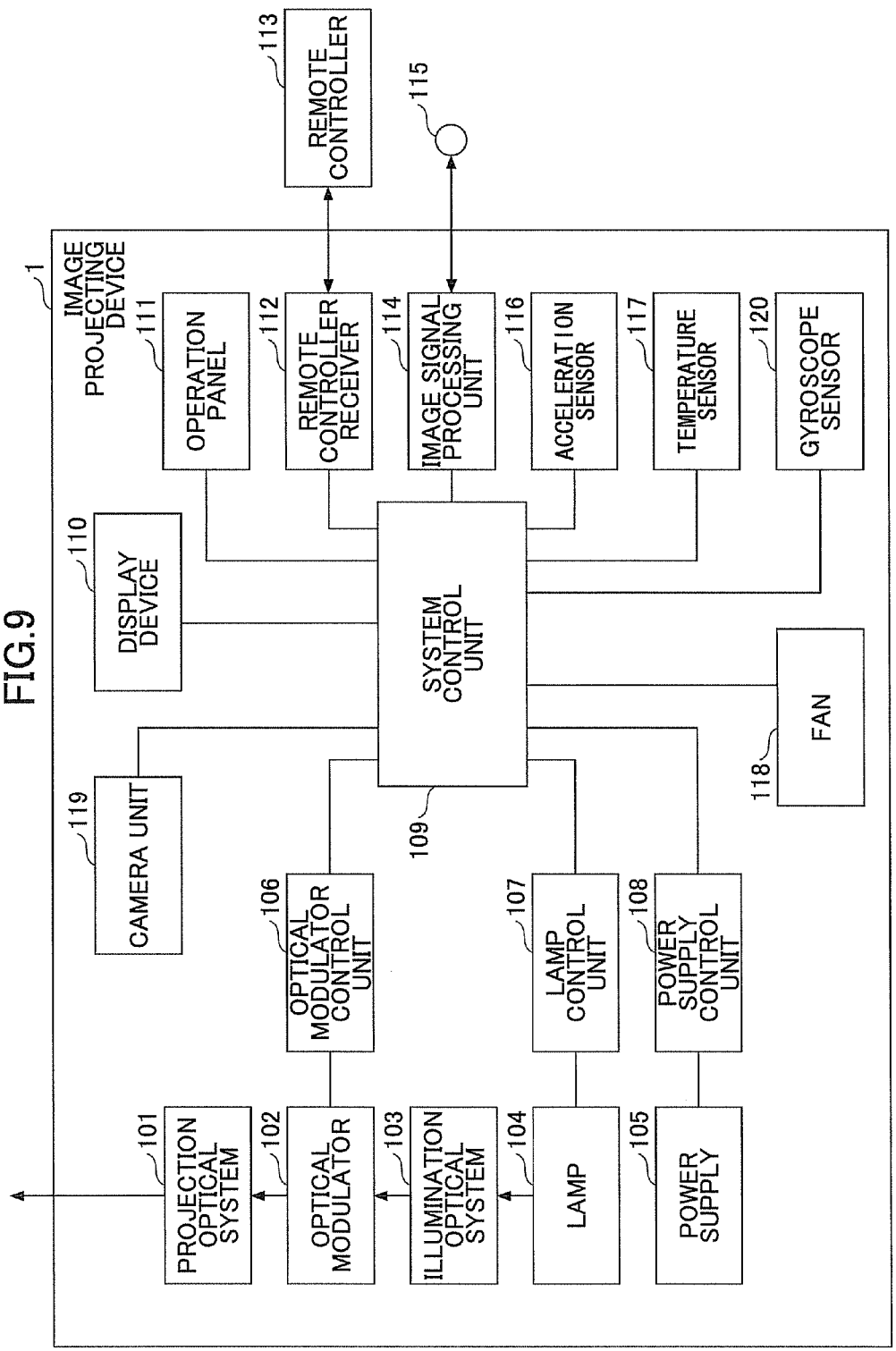
FIG. 9 is a diagram for illustrating an example of a hardware configuration of the image projecting device according to the second embodiment.

FIG. 9 is a diagram for illustrating an example of a hardware configuration of the image projecting device 1 according to the second embodiment.

The image projecting device 1 according to the embodiment additionally includes a camera unit 119 and the gyroscope sensor 120. The camera unit 119 includes a mechanical part and a circuit part corresponding to the camera 7. The camera unit 119 is capable of analyzing the captured image to recognize a human. The gyroscope sensor 120 measures the angular velocity of the image projecting device 1 around the vertical direction to detect a rotation angle of the image projecting device 1. Other configurations are the same as illustrated in FIG. 3.

Figure 10:
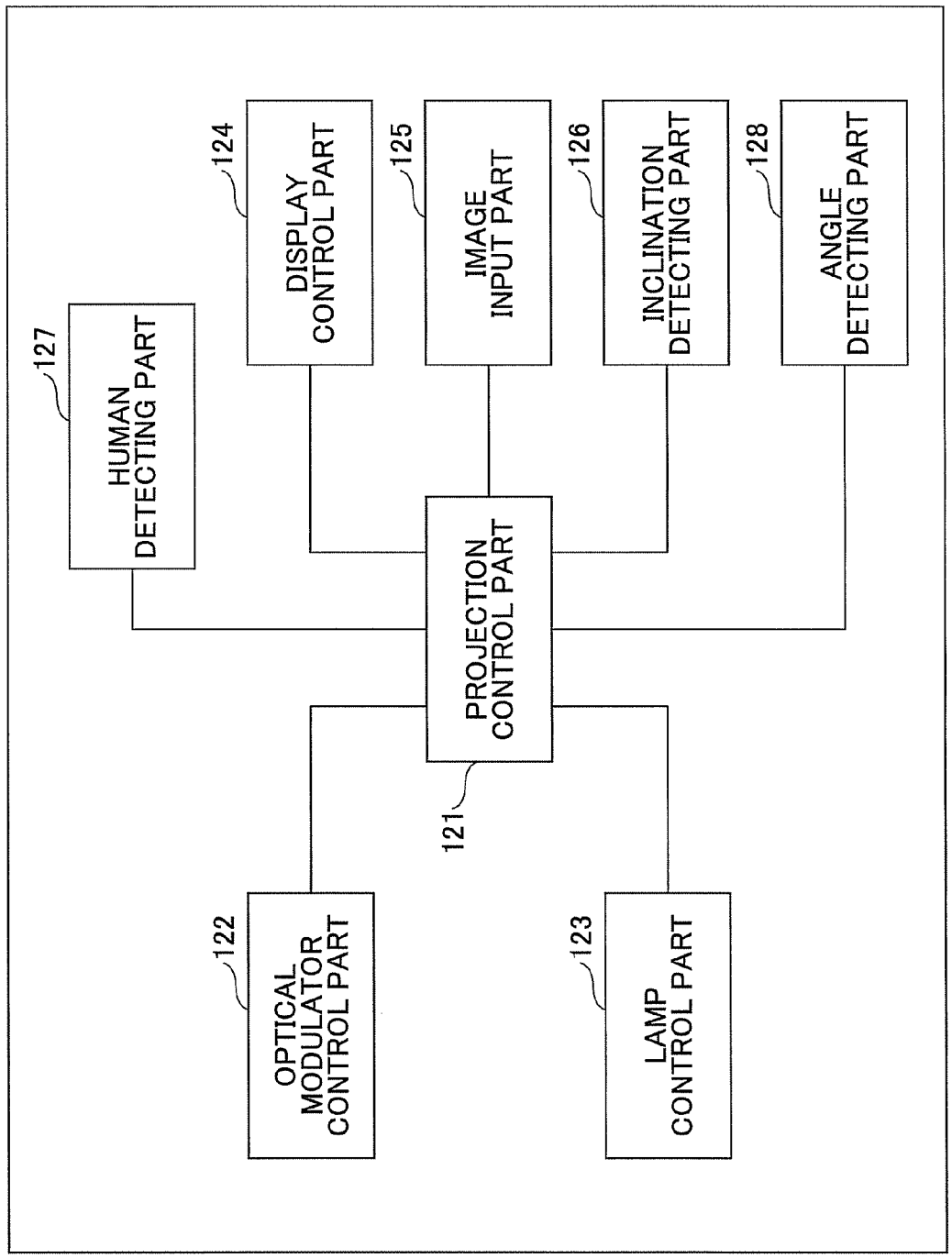
FIG. 10 is a diagram for illustrating an example of a function of a control system of the image projecting device according to the second embodiment.

FIG. 10 is a diagram for illustrating an example of a function of a control system of the image projecting device 1 according to the second embodiment.

The image projecting device 1 according to the embodiment additionally includes a human detecting part 127 and an angle detecting part 128. The human detecting part 127 periodically performs an image capturing process using the camera 7 during the image projection. Further, the human detecting part 127 analyzes the image captured by the camera 7 to recognize a human. The human detecting part 127 obtains information on a position of the human with respect to the image projecting device 1. The angle detecting part 128 periodically performs measurement to determine whether the image projecting device 1 is rotated using the gyroscope sensor 120 during the image projection. If the image projecting device 1 is rotated, the rotation angle is measured. Other configurations are the same as illustrated in FIG. 4.

Figure 11:
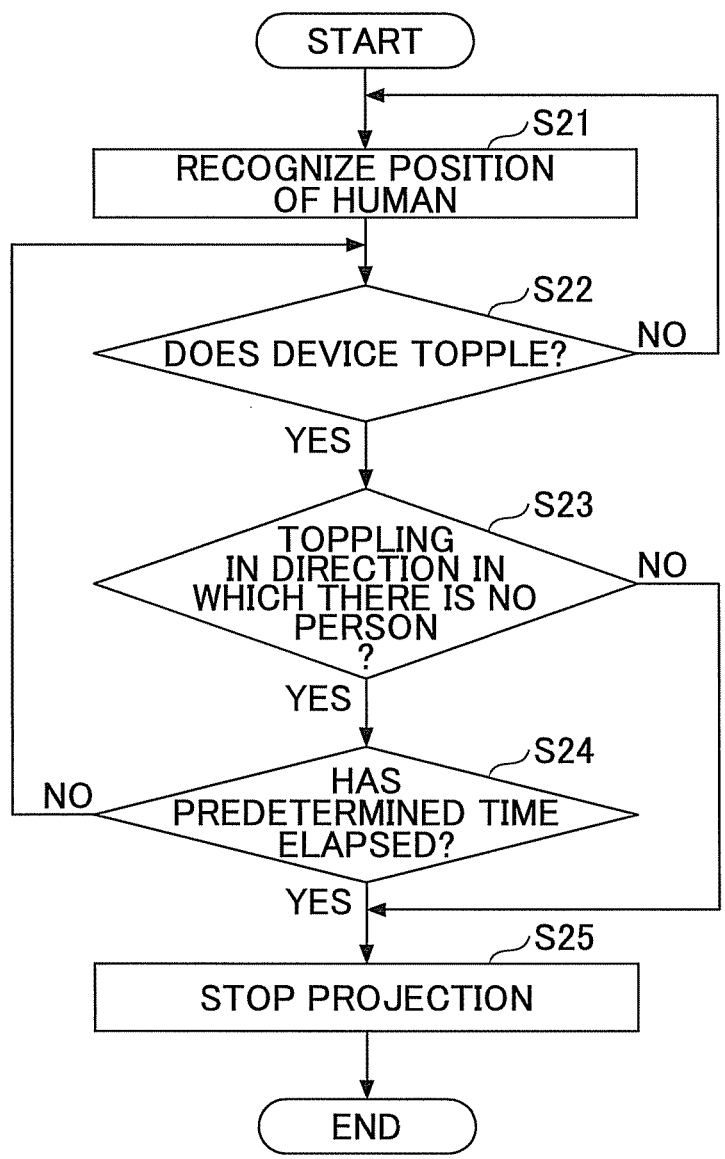
FIG. 11 is a flowchart for illustrating an example of a process of the image projecting device according to the second embodiment.

FIG. 11 is a flowchart for illustrating an example of a process of the image projecting device 1 according to the second embodiment.

When the process is started at power-on of the image projecting device 1 or process restarting, the human detecting part 127 recognizes the position of the human based on the information obtained by the camera 7 (step 21).

Figure 12:
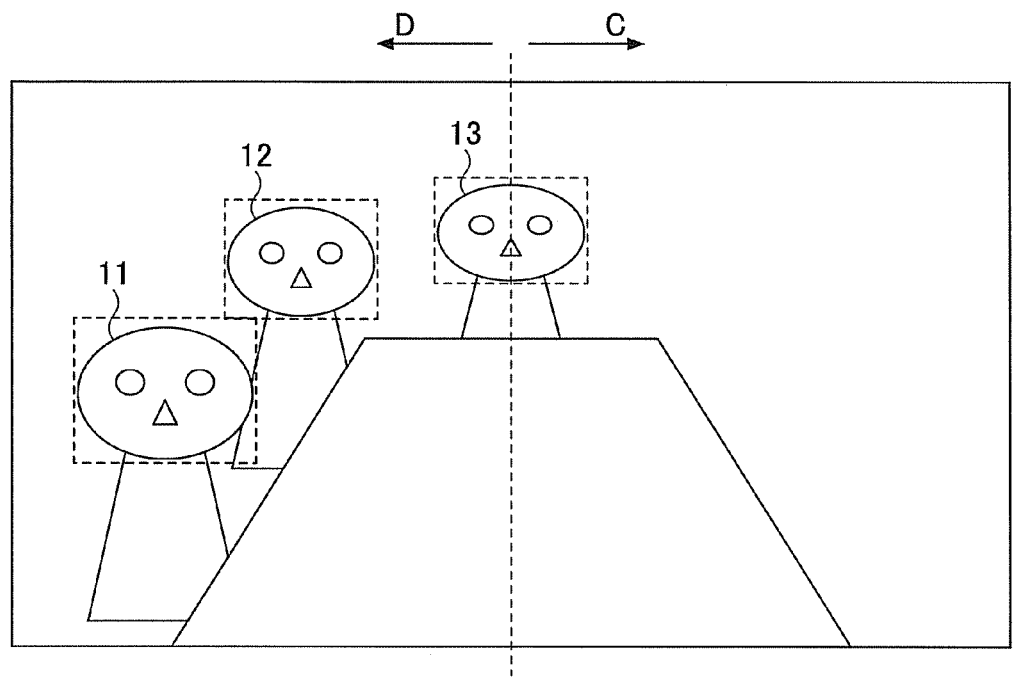
FIG. 12 is a diagram for illustrating an example of recognition of a position of a human with a camera unit (no. 1).

FIG. 12 is a diagram for illustrating an example of recognition of the position of the human with the camera unit 119, and illustrates an example of the image captured by the camera 7. Here, it is assumed that there are three persons sitting around the table, two persons (persons 11 and 12) sitting on the right side (direction D) when viewing the screen, and one person (person 13) sitting at a center. It is assumed that there is no person on the left side (direction C).

The human detecting part 127 processes the image captured by the camera 7 to analyze for humans by performing a pattern matching process using a master pattern of a human face (including parts of the eyes, a nose, a mouth, etc., in predetermined ranges within an elliptical outline). In this case, the persons 11 through 13 can be detected in the direction D.

Figure 13:
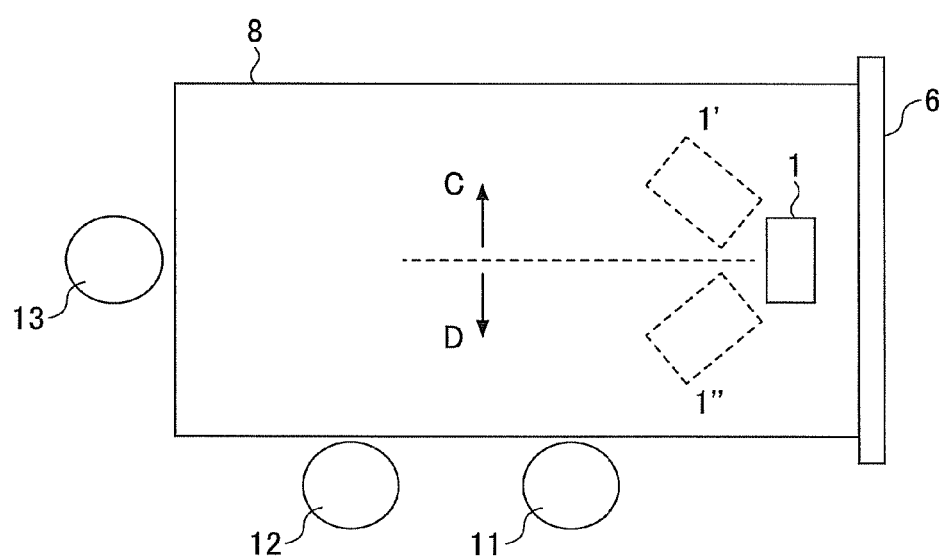
FIG. 13 is a diagram for illustrating an example of recognition of a position of a human with a camera unit (no. 2).

FIG. 13 is a diagram for illustrating a status of the conference room from an upper side in the case of FIG. 12. If the image projecting device topples in the direction D (in the case of a status indicated by 1"), it is desired to turn off the light as soon as the toppling is detected because there are persons in the direction D. On the other hand, if the image projecting device 1 topples in the direction C (in the case of a status indicated by 1'), it is not necessary to immediately turn off the light because there is no person in the direction C.

Referring to FIG. 11 again, the projection control part 121 checks whether the image projecting device topples based on the inclination angle information from the inclination detecting part 126 (step 22).

if it is determined that the image projecting device does not topple (No in step 22), nothing special is done, and after a predetermined time has elapsed, the position of the human is recognized again (step 21).

If it is determined that the image projecting device topples (Yes in step 22), it is determined whether the image projecting device topples in a direction in which there is no person based on the human position information from the human detecting part 127 and the rotation angle information from the angle detecting part 128 (step 23).

If it is determined that the image projecting device topples in the direction in which there is no person (Yes in step 23), it is determined whether a predetermined time has elapsed since it is determined that the image projecting device topples (step 24). If the image projecting device 1 topples in the direction in which there is no person, the projected light is not shown into the eyes of the viewer and thus it is not necessary to immediately stop the projection. However, since it is not safe to continue the projection in terms of the cooling mechanism of the image projecting device 1, it is determined whether a predetermined time has elapsed.

If it is determined that the predetermined time has not elapsed yet (No in step 24), the process routine returns to the checking process for checking whether the image projecting device topples (step 22). The reason why the process routine returns to the checking process is because it is predicted that the user restores the toppled image projecting device to its original status.

If it is determined that the image projecting device topples in the direction in which there is a person (No in step 23) or that the predetermined time has elapsed even though the image projecting device toppled in the direction in which there is no person (Yes in step 24), the projection is stopped (step 25). Specifically, the projection control part 121 transmits an instruction to stop the projection to the optical modulator control part 122, the lamp control part 123 and the display control part 124. The optical modulator control part 122, in response to the instruction, controls the optical modulator 102 such that the projecting image is turned off. Further, the lamp control part 123 turns the lamp 104 off. The display control part 124 turns on or off the LEDs of the display device 110 to inform the user that the projection is stopped due to the toppling.

It is noted that, according to the example described above, if the image projecting device 1 topples in the direction in which there is no person, the elapsed time after the toppling is used to determine whether to continue or stop the projection; however, it may be checked whether a temperature in the image projecting device 1 is greater than a predetermined value using the temperature sensor 117 to determine whether to continue or stop the projection (continue the projection if the temperature is not greater than the predetermined value, and stop the projection if the temperature is greater than the predetermined value).

Further, according to the example described above, the position of the human around the image projecting device 1 is detected by analyzing the image captured by the camera 7; however, the position of the human may be detected using an infrared sensor.

[Summary]

As described above, according to the present embodiments, there are advantages as follows.

(1) The image projection is stopped if the image projecting device topples in the direction in which the projected light is directed to the human, while the image projection is continued if the projected light is not directed to the human. Thus, the stoppage of the image projection can be minimized and a waiting time required to resume the projection is eliminated, thereby increasing convenience.

(2) The image projection is stopped when the predetermined time has elapsed or the device temperature reaches the predetermined temperature event if the image projecting device topples in the direction in which the projected light is not directed to the human. Thus, it is possible to prevent the failure of the image projecting device due to the cooling mechanism which does not work normally.

(3) The implementation is most preferably applied to the ultra-short focus projector with a vertical configuration; however, there is a probability of toppling as long as the image projecting device is not of a fixed type. In this sense, the implementation can be applied to the image projecting device other than the ultra-short focus projector with a vertical configuration to obtain the effects described above.

Embodiments of the present invention have been described heretofore for the purpose of illustration. The present invention is not limited to these embodiments, but various variations and modifications may be made without departing from the scope of the present invention. The present invention should not be interpreted as being limited to the embodiments that are described in the specification and illustrated in the drawings.

The present application is based on Japanese Priority Application No. 2011-164545, filed on Jul. 27, 2011, the entire contents of which are hereby incorporated by reference.

What is claimed is:

1. An image projecting device for projecting an image on a screen, comprising:
    a toppling detecting part that detects a toppling of the image projecting device;
    a toppling direction detecting part that detects a direction in which the image projecting device topples; and
    a controlling part that controls the image projecting device such that the image projecting device continues to project the image when the toppling detecting part detects the toppling of the image projecting device and the toppling direction detected by the toppling direction detecting part is directed toward the screen, while the image projecting device stops projecting the image when the toppling direction detected by the toppling direction detecting part is directed away from the screen.

2. The image projecting device of claim 1, wherein
    the toppling direction detecting part includes a detecting part that detects a position of a human existing around the image projecting device, and determines whether the toppling of the image projecting device is in the direction to the position of the human detected by the detecting part,
    the controlling part performs a control by determining that the toppling of the image projecting device in a direction other than the direction to the position of the human is the toppling in the direction toward the screen, and the toppling of the image projecting device in the direction to the position of the human is the toppling in the direction away from the screen.

3. The image projecting device of claim 1, wherein
    the controlling part calculates an elapsed time after the toppling in the case of the toppling in the direction toward the screen, and stops projecting the image when the elapsed time after the toppling exceeds a predetermined time, and
    in the case of the toppling in the direction toward the screen, the controlling part determines whether the image projecting device is still in a toppled status before the elapsed time exceeds the predetermined time, and stops calculating the elapsed time when the controlling part determines that the image projecting device is not in a toppled status.

4. The image projecting device of claim 1, further comprising:

a temperature measuring part that measures a temperature inside the image projecting device, wherein
in the case of the toppling in the direction toward the screen, the controlling part stops projecting the image when the temperature measured by the temperature measuring part exceeds a predetermined value.

* * * * *